United States Patent
Dang et al.

(10) Patent No.: US 10,412,695 B2
(45) Date of Patent: *Sep. 10, 2019

(54) METHODS AND APPARATUS FOR SYNCHRONIZED VIEWING EXPERIENCE ACROSS MULTIPLE DEVICES

(71) Applicant: Time Warner Cable Enterprises LLC, St. Louis, MO (US)

(72) Inventors: Niem Dang, Sterling, VA (US); Kenneth Gould, Reston, VA (US); Joseph Forehand, Lone Tree, CO (US)

(73) Assignee: Time Warner Cable Enterprises LLC, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/659,483

(22) Filed: Jul. 25, 2017

(65) Prior Publication Data
US 2017/0339651 A1 Nov. 23, 2017

Related U.S. Application Data

(63) Continuation of application No. 14/684,001, filed on Apr. 10, 2015, now Pat. No. 9,743,368.

(51) Int. Cl.
*H04W 56/00* (2009.01)
*H04L 29/06* (2006.01)

(52) U.S. Cl.
CPC ....... *H04W 56/001* (2013.01); *H04L 65/4076* (2013.01); *H04L 65/4084* (2013.01)

(58) Field of Classification Search
CPC ........... H04W 56/001; H04W 65/4076; H04W 65/4084; H04W 56/00; H04L 29/06

USPC ........................................................ 370/350
See application file for complete search history.

(56) References Cited

U.S. PATENT DOCUMENTS

| 5,926,206 A | * | 7/1999 | Mihara | ................. H04H 20/22 348/E7.071 |
| 7,908,389 B2 | * | 3/2011 | Zuckerman | ....... G06F 17/30206 709/231 |
| 7,954,128 B2 | * | 5/2011 | Maynard | ............. H04L 12/2801 725/88 |
| 8,190,683 B2 | * | 5/2012 | Sloo | .................... H04N 7/17318 709/204 |

(Continued)

*Primary Examiner* — Man U Phan
(74) *Attorney, Agent, or Firm* — Straub & Straub; Michael P. Straub; Stephen T. Straub

(57) ABSTRACT

Methods and apparatus for synchronizing devices corresponding to a customer are described. A plurality of devices are associated with a customer record. The customer indicates which one or ones of the devices are to be synchronized from a content playback perspective. Content delivery delays based on a time stamp included in content sent to the devices to be synchronized is determined by the devices and reported to a control device. Transmission of on-demand content is adjusted on a per device basis, e.g., delayed or advanced, to achieve synchronized delivery. For content transmitted according to a schedule, a delay may be communicated to the playback device and the device delays output of received content to synchronize output with other devices. Customer premise records include a list of devices to be synchronized along with transmission and/or output timing adjustment information on a per device basis.

20 Claims, 8 Drawing Sheets

(56) References Cited

U.S. PATENT DOCUMENTS

| | | | |
|---|---|---|---|
| 8,661,481 B2* | 2/2014 | Maynard | H04L 12/2801 |
| | | | 725/88 |
| 8,732,777 B2* | 5/2014 | Xu | H04L 12/1881 |
| | | | 370/395.21 |
| 9,281,013 B2* | 3/2016 | Lee | H04N 21/4307 |
| 9,456,235 B1* | 9/2016 | Greenfield | H04N 21/25883 |
| 2014/0047131 A1* | 2/2014 | Bicakci | G06F 17/30044 |
| | | | 709/248 |
| 2014/0258414 A1* | 9/2014 | Kitano | G06Q 10/10 |
| | | | 709/204 |
| 2015/0134724 A1* | 5/2015 | Hao | H04L 65/60 |
| | | | 709/203 |
| 2015/0135242 A1* | 5/2015 | Riedl | H04N 7/17318 |
| | | | 725/93 |

* cited by examiner

METHODS AND APPARATUS FOR SYNCHRONIZED VIEWING EXPERIENCE ACROSS MULTIPLE DEVICES

RELATED APPLICATIONS

The present application is a continuation of U.S. patent application Ser. No. 14/684,001 filed Apr. 10, 2015, which issued as U.S. Pat. No. 9,743,368, and which is hereby expressly incorporated by reference in its entirety.

FIELD OF THE INVENTION

The present invention relates to methods and apparatus relating to synchronized content viewing across multiple devices and, more particularly, to methods and apparatus that support synchronizing content viewing across multiple devices associated with a customer account.

BACKGROUND OF THE INVENTION

As advancements in the provision of on-demand content delivery and IP content delivery have occurred, many customers of cable and/or other content broadcast services expect to be able to receive content on a number of different devices associated with their customer account.

While broadcast content such as that provided to set top boxes according to a TV broadcast schedule are broadcast at a predictable time, many IP based and on-demand based content delivery services provide content on demand, e.g., in response to a user request.

While the servers may be synchronized to a common time clock such as a GPS signal based network time clock or another universal time clock, even if content is transmitted at the same time it may be delivered via different networks resulting in different transmission delays.

Because of the difference in transmission delays, different devices corresponding to a customer at the same household may receive content corresponding to a program in a manner that is time shifted and not synchronized due to the differences in the network content delivery paths. As a user changes from one device to another, e.g., as the user moves from a living room with a STB that receives broadcast content and moves to another room and seeks to receive the remainder of a program via IP delivery on a mobile device or another IP device, the user will normally notice a difference in the point at which the program is being provided to the different devices because of platform and/or network differences associated with the different devices.

In order for a customer to assume a smooth experience when switching between different devices while watching a program, it would be desirable if methods and/or apparatus could be developed which would allow the customer to received content in a manner that is synchronized across the customers devices without the customer having to take into consideration content delivery differences between different devices or the type of communications network being used to deliver the content to the user.

It should be appreciated that there is a need for methods and apparatus which can be used to allow a user viewing content on a first device to continue viewing the same content on one or more devices associated with the customer account in a synchronized manner providing the user consistent and seamless viewing experience across multiple devices.

SUMMARY

Methods and apparatus for synchronizing devices corresponding to a customer are described. In accordance with one exemplary embodiment a plurality of devices are associated with a customer account. The customer indicates which one or ones of the devices are to be synchronized from a content playback perspective. Since different devices may be provided content via different network connections and/or from different content servers, content transmitted to different customer devices may, and normally will be, subject to different communications delays. In some embodiments at least one customer playback device receives a content stream, e.g., a linear content stream, broadcast from a content server at a network headend according to a broadcast schedule. As part of the content broadcast, the broadcast server includes with the communicated content a reference time, in some embodiments this reference time is synchronized with a network clock which may have been and normally is synchronized to a global time clock such as a GPS time clock or a time communicated by a time clock server. The various customer playback devices which may be subject to content playback synchronization also have access to the global time clock or network time clock upon which the time stamp inserted into the broadcast content is based. Thus, a receiving device can check its time clock, which is synchronized directly or indirectly with the time clock used to generate the transmission time stamp included in the broadcast content, and determine the transmission delay between the transmission device which inserted the time stamp and customer premise device. In order to reduce the effect of packet jitter and/or variations in network delays the receiving device may determine the average delay for multiple packets including time stamps and report back the average delay detected for the reporting device rather than a delay for an individual packet.

While, in one embodiment, the delivery delay associated with a device receiving a video content stream being delivered according to a transmission broadcast schedule, such as determined by a TV guide or other predetermined schedule, is reported to a control device when the playback device tunes to the broadcast channel, devices which receive on-demand content streams may report timing delay information in response to a synchronization signal initiated by a customer or by the control device. Devices which receive on-demand content streams receive a time stamp sent, e.g., in a packet, from an on-demand content server, e.g., an IP capable device, responsible for serving the client device. The time stamp indicates a transmission time from the on-demand content server and is based on the global or other network time reference to which the playback devices have access. The playback device, e.g., an IP playback device, determines based on its clock time which is synchronized to the standard reference time, the delay associated with the transmission of the packet including the time stamp to the playback device. The playback device then reports the determined delay to the control device. The control device updates the customer record corresponding to the reporting devices so that the record includes reported transmission delay information.

In response to the synchronization request received from a customer or based on an automatic synchronization setting, the control device in some embodiments determines for the devices corresponding to a customer record the maximum delivery delay for the devices which are to be synchronized. The control device then determines, for each device to be synchronized, the amount of delay that should be introduced into the delivery path so that the set of devices to be synchronized will receive content in a synchronized manner. For devices which receive content on demand, this involves the control device controlling a transmission element, e.g., a content server transmitting content to devices receiving on demand content, to introduce a delay into the transmission paths of the devices corresponding to the customer record having less than the delay corresponding to a device that the customer indicated to serve as the master device for synchronization purposes. In the case of the device or devices, e.g., set to boxes, which receive and output the broadcast content stream transmitted in accordance with the broadcast transmission schedule, it may not be practical to introduce a delay into the broadcast transmission path since this may affect other devices which also receive the broadcast transmission. In at least some embodiments, rather than introduce a delay into a broadcast transmission path to synchronize device reception, the playback device receiving the broadcast is provided with a recommended delay to be introduced by the playback device prior to the broadcast content being output, e.g., displayed, to the customer. Thus, by delaying output and presentation of the broadcast content by an amount determined based on the delivery delay corresponding to one or more devices, e.g., IP devices, which are to be synchronized with the set top box, content playback between devices corresponding to a customer may be synchronized without having to affect the transmission time of the broadcast linear content.

While a user may select to have all devices associated with the user's customer record automatically synchronized, a user may intentionally choose not to synchronize some devices, e.g., a cell phone device for example, to avoid or reduce the amount of signaling associated with some networks, e.g., the cellular network and/or to avoid having multiple devices synchronized based on one device with an unusually long delay. Thus, in some embodiments devices, which the user specifies should be synchronized, will be synchronized taking into consideration the possible delays associated with the different networks which may be used to deliver content to the user specified devices but delays with regard to devices which a user indicates are not to be synchronized will not be taken into consideration when performing the synchronization operation.

The content delivery methods and apparatus can be used to synchronize content delivery to multiple playback devices to which content can be communicated in parallel, e.g., in a synchronized manner.

While various embodiments have been discussed in the summary above, it should be appreciated that not necessarily all embodiments include the same features and some of the features described above are not necessary but can be desirable in some embodiments.

It should be appreciated that numerous additional variations and embodiments are possible and remain within the scope of the invention. Numerous additional features, embodiments and benefits of various embodiments are discussed in the detailed description which follows.

BRIEF DESCRIPTION OF THE DRAWINGS

FIG. 2 shows that FIGS. 2A and 2B in combination form FIG. 2.

DETAILED DESCRIPTION

Figure 1:
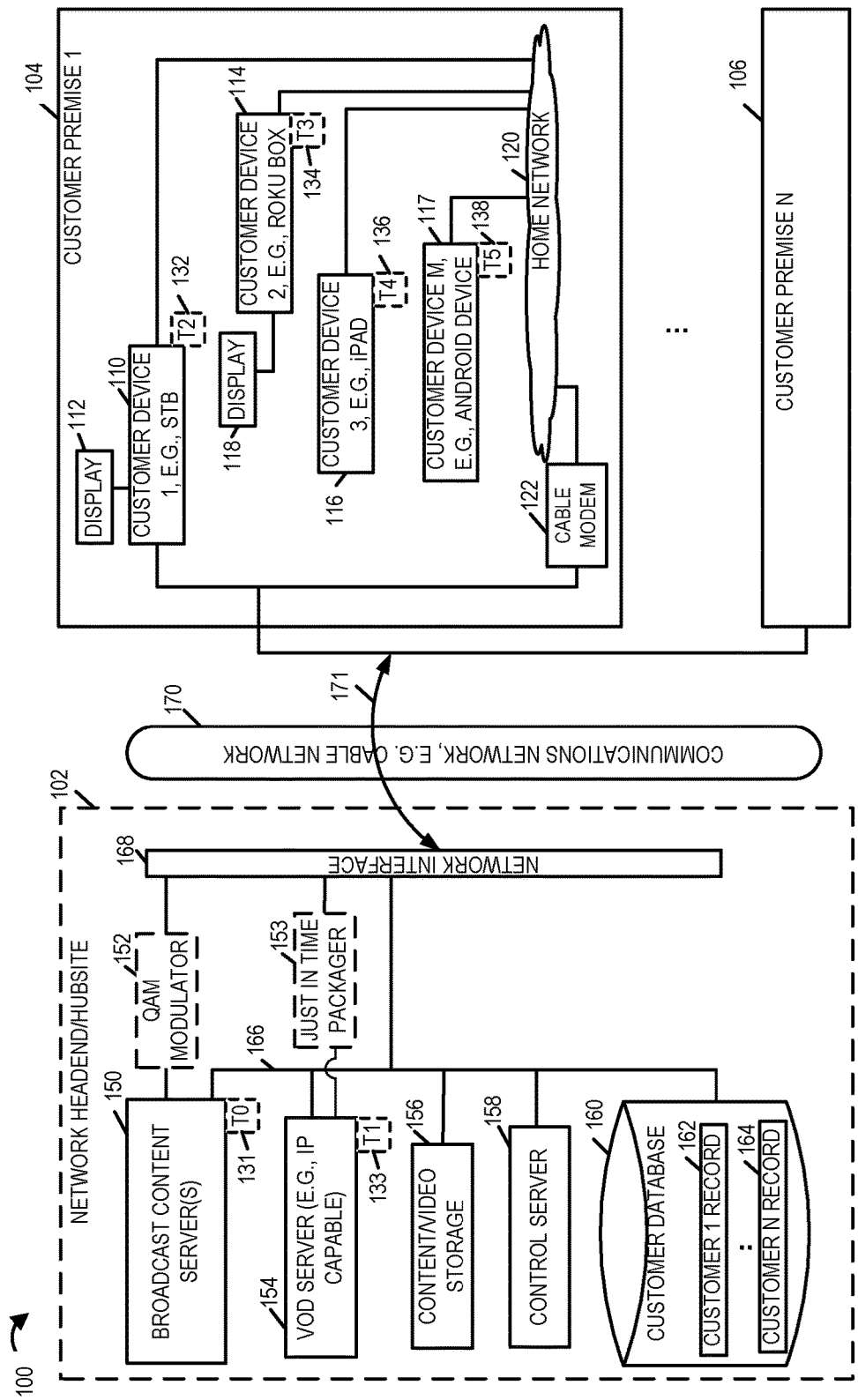
FIG. 1 illustrates an exemplary system implemented in accordance with the some embodiments of the present invention.

FIG. 1 illustrates an exemplary system 100 implemented in accordance with one exemplary embodiment of the present invention. The system 100 supports delivery of content to customer premise equipments (CPEs) including content playback devices in accordance with various embodiments of the invention. The system 100 includes a service provider network headend/hubsite 102, a communications network 170, e.g., a hybrid fiber-coaxial (HFC) network, satellite network, and/or internet, and a plurality of customer premises 104, 106. In cable network embodiments the network headend is a data or other service center to which multiple households are normally coupled and where one or more servers are located. In other types of networks the network headend 102 may, and sometimes is, implemented as a data center with one or more servers and/or other equipment used to provide video and/or other services. In various embodiments the content, e.g., multimedia content, is delivered from the headend 102 over the communications network 170 to one or more devices at the customer premises 104, 106 via content streams depending on the customer device capability and/or user preference. In some embodiments the customer premises 104, 106 include a variety of devices including, e.g., legacy set top box (STB) devices, smart phones, IP capable devices such as laptops, iPADs, Android tablets or other devices, smart TVs, streaming devices such as ROKU® box etc.

The network headend 102 may be implemented at a cable network office or hubsite serving a plurality of customer premises and includes multiple servers and databases which are coupled together as shown. In the FIG. 1 example, the headend 102 includes broadcast content server(s) 150 (e.g., including one or more of a broadcast file server (BFS) and a switched digital video (SDV) content server), a video on-demand (VOD) server 154, a content storage 156, a control server 158, and a customer database 160. The network headend 102 in some embodiments also includes a QAM (Quadrature Amplitude Modulation) modulator 152 coupled to the broadcast content server(s) 150 and a JIT (just in time) packager 153 coupled to the VOD server 154. While the elements QAM modulator 152 and JIT packager 153 are shown to be included in the headend 102, these elements are optional and may reside outside in the network 170. In some embodiments the QAM modulator 152 is included in the broadcast content server(s) 150 while the JIT packager 153 may be included in the VOD server 154. The term VOD server is intended to cover a wide range of different types of VOD servers and is not limited to a particular analog or IP (Internet Protocol) based embodiment or an embodiment which is limited to delivery via a particular type of network.

It should be appreciated that some of the servers and/or elements shown to be included in the headend 102 may reside outside the headend 102 in some embodiments and may be located anywhere in the system 100, e.g., in a distributed manner. In the FIG. 1 example, various servers and other elements included in the headend 102 are coupled together by a local network 166. The local network 166 is coupled via one or more network interfaces 168 to other networks and/or devices. For example, the headend 102 is coupled via network interface 168 to communications network 170, e.g., a cable network, and may also be coupled to one or more other external networks.

Via the network 170, the elements shown in the network headend 102 can send and/or exchange information with the devices located at the customer premises 104, 106. As shown in FIG. 1, communications link 171 traversing the communications network 170 couples the CPEs at the customer premises 104, 106 to the various elements/servers shown in the network headend 102. System 100 supports transmission of content over various platforms using a variety of streaming technologies including, e.g., Radio frequency (RF including broadcast, switched or on demand), over-the-top content (OTT), Adaptive bit rate (ABR) or other means like Multimedia over Coax (MoCA). Thus the devices to be synchronized may receive content via any one of a variety of networks with different devices in some cases receiving content via different networks and thus being subject to different delivery delays.

The content server(s) 150 in some embodiments include a BFS, a switched digital video (SDV) server, and/or another server that can be used to deliver broadcast content to CPEs such as a set top box (STB) which support receiving content by tuning to, e.g., QAM broadcast stream broadcast by the content server(s) 150. The video on-demand (VOD) server 154 is responsive to on-demand requests and delivers, on-demand programming content including that which is ordered by one or more customers and/or other information to one or more customer devices, e.g., set-top boxes and/or other devices. In some embodiments the VOD server 154 is configured to deliver content to one or more customer premises via an IP channel (Content Distribution Network or CDN) and/or a VOD channel. In various embodiments the content delivery servers 150, 154 access the programming content from the storage 156 and generate transport streams suitable for delivery to various customer devices via the communications network 170. In the example of FIG. 1, T0 131 represents a first time stamp indicating a time (e.g., as per network's clock) that may be included in a first signal broadcast by the broadcast server(s) 150 to a first customer device, e.g., STB 110. In some embodiments the content server(s) 150 transmits content including the first time stamp T0 131 in accordance with a broadcast schedule. T1 133 represents a second time stamp indicating a time (e.g., as per network's clock) that may be included in a second signal sent by the VOD server 154 to a second customer device, e.g., device 114.

Content storage 156 stores programming content, e.g., audio and video content which may be delivered by the content server(s) 150 and/or VOD server 154, e.g., as part of a content broadcast and/or in response to a user request for content received via network 170 from one or more devices at customer locations 104, 106.

The control server 158 is optionally included in the headend 102 and may reside externally and performs in accordance with the invention. The control server 158 in some embodiments is configured to receive transmission delay information and synchronization requests from one or more customer devices. The control server 158 generates and communicates delay signals communicating delay information to be used in transmitting content to customer devices for synchronized content delivery and/or to be applied by a customer device to achieve synchronized content output in accordance with the features of the invention. In accordance with the features of present invention, by controlling delay of transmission of content and/or by providing delay to be applied by a customer device, synchronized content viewing experience by a customer is achieved that allows the customer to seamlessly move from watching content on a device to another device in continuity without having to repeat already watched content.

The customer database 162 includes, for a plurality of customers, customer information, e.g., customer record 1 162, ... customer record N 162 corresponding to customers associated with customer premises 104, 106. Each customer record 162, 164 includes, for a corresponding subscriber, customer account information, information regarding devices associated with the customer account and other customer related information. In some embodiments each customer record further includes information indicating customer specified devices that the customer wants to be synchronized for content delivery and/or content viewing purposes. In some embodiments the customer records 162, 164 include timing adjustment information and/or delay information, reported by one or more devices associated with the customer account corresponding to the customer records 162, 164. Transmission timing adjustments to be made to achieve synchronized content reception and/or viewing across devices maybe and sometimes is stored on a per device basis. A user can specify a device to be used as a "master" device for timing synchronization purposes or the device which receives the content with the shortest overall transmission delay could be selected as the master. While a single profile is shown for each customer premise, e.g. associated with a customer account, a single account may have multiple profiles and corresponding records stored. For example different users associated with a customer account may have individual records and/or profiles indicating a particular group of devices associated with the account to be synchronized and indicating, in some cases, which of the devices is to be used as a master. Thus, different users of a customer account may have different sets of devices which are synchronized for content delivery purposes. The devices may be used in the customer premise and/or outside the customer premise. The devices may include devices which received broadcast content as well as devices which received on-demand content via a different delivery network than the devices which received the scheduled broadcast content.

In some embodiments customer records 162, 164 further include, e.g., account number, subscription/service information, customer device capability, and device information, e.g., identification and/or other information regarding customer devices such as STBs, streaming devices, gateways, modems etc., installed at various customer premises served by the headend 102 and/or otherwise which are associated with the customer accounts.

Referring now to the customer premises shown in system 100. Each customer premise 104, 106 may include a plurality of CPEs including playback devices. In various embodiments the CPEs located at the customer premises include, e.g., modems, gateway devices, routers, and playback devices including, e.g., set top box, internet capable TVs, personal computers, laptops, tablet devices, smart phones etc. In various embodiments a content playback device presents the program content to a viewer, e.g., customer/subscriber. FIG. 1 shows some details of customer premise 1 104. Customer premise N 106 may be similar to the customer premise 104 and may include same or similar CPEs.

The customer premise 104 includes a modem 122 and various devices including a customer device 1 110, customer device 2 114, customer device 3 116, . . . , and customer device M 117 that are associated with a customer account corresponding to the customer who corresponds to the customer premise 104. Thus it should be appreciated that a variety of devices may be assocexist at a single customer premise where the devices may be coupled together by a home network 120, e.g., Ethernet and/or wireless LAN. While in FIG. 1 embodiment the various customer devices are shown at the customer premise 104, all the devices need not be present at the customer premise 104. Rather, any of the customer devices 110, 14, 116, 117 associated with the customer account can receive services from the service provider's headend 102 even if not present at the customer premise, e.g., outside of the customer premise 104 (e.g., home).

As shown, the customer device 110, e.g., a STB, is coupled to display device 112, customer device 2 114, e.g., a steaming device such as a ROKU box, is coupled to display device 118, customer device 3 116 is, e.g., a tablet device such as an iPAD, and the customer device M is, e.g., an ANDROID device such as a Smartphone. It should be appreciated that in some embodiments customer devices can be integrated in a device which also includes a display. The display devices could be, e.g., standard televisions. In some embodiments the STB 110 may be e.g., a legacy QPSK STB, a DOCSIS (Data Over Cable Service Interface Specification) set top box, an SDV capable set top box, an IP-STB, and/or a hybrid set top box. In some embodiments the STB 110 supports receiving programming content via a QAM broadcast stream from the content server(s) 150. The customer devices 114, 116 and 117 are capable of receiving IP program content streams from the VOD server 154 (or any other IP capable device such as any online video distributor (OVD)) and performing playback. In the example of FIG. 1, T2 132 represents a time (e.g., as per the clock of device 110 which is synchronized with the network's clock in some embodiments) at which the first signal from the broadcast server(s) 150 is received by the first customer device 110. T3 134 indicates a time (e.g., as per the clock of device 114 which is synchronized with the network's clock in some embodiments) at which the second signal sent by the VOD server 154 is received at the second customer device 114. T4 136 indicates a time at which a third signal sent by the VOD server 154 is received at the third customer device 116. T5 138 indicates at which a signal sent by the VOD server 154 (or an OVD) is received at the customer device M 117.

Figure 2A:
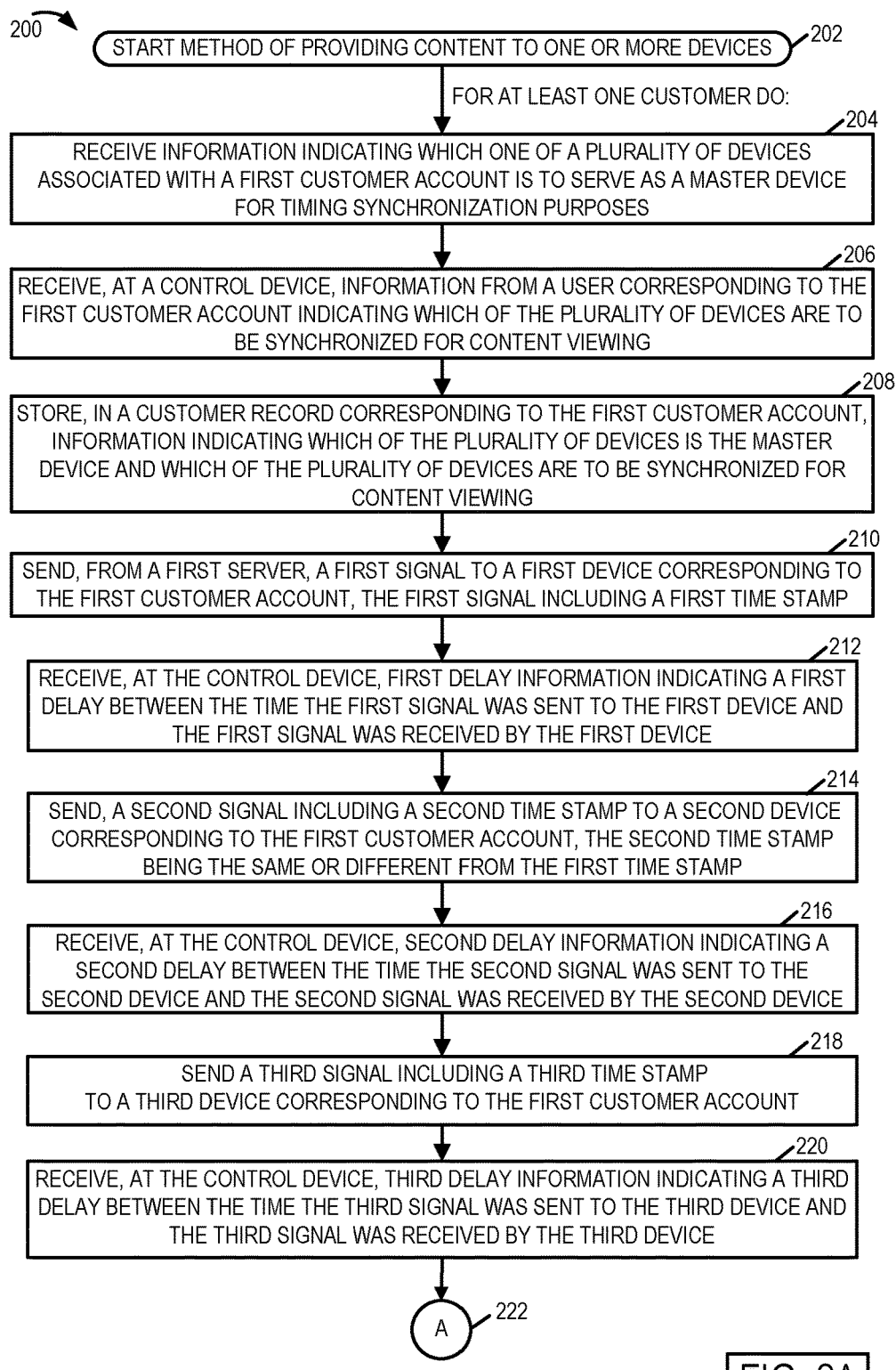
FIG. 2A illustrates a first part of a flowchart showing the steps of an exemplary method of providing content to one or more devices in accordance with an exemplary embodiment implemented using the system shown in FIG. 1.
Figure 2B:
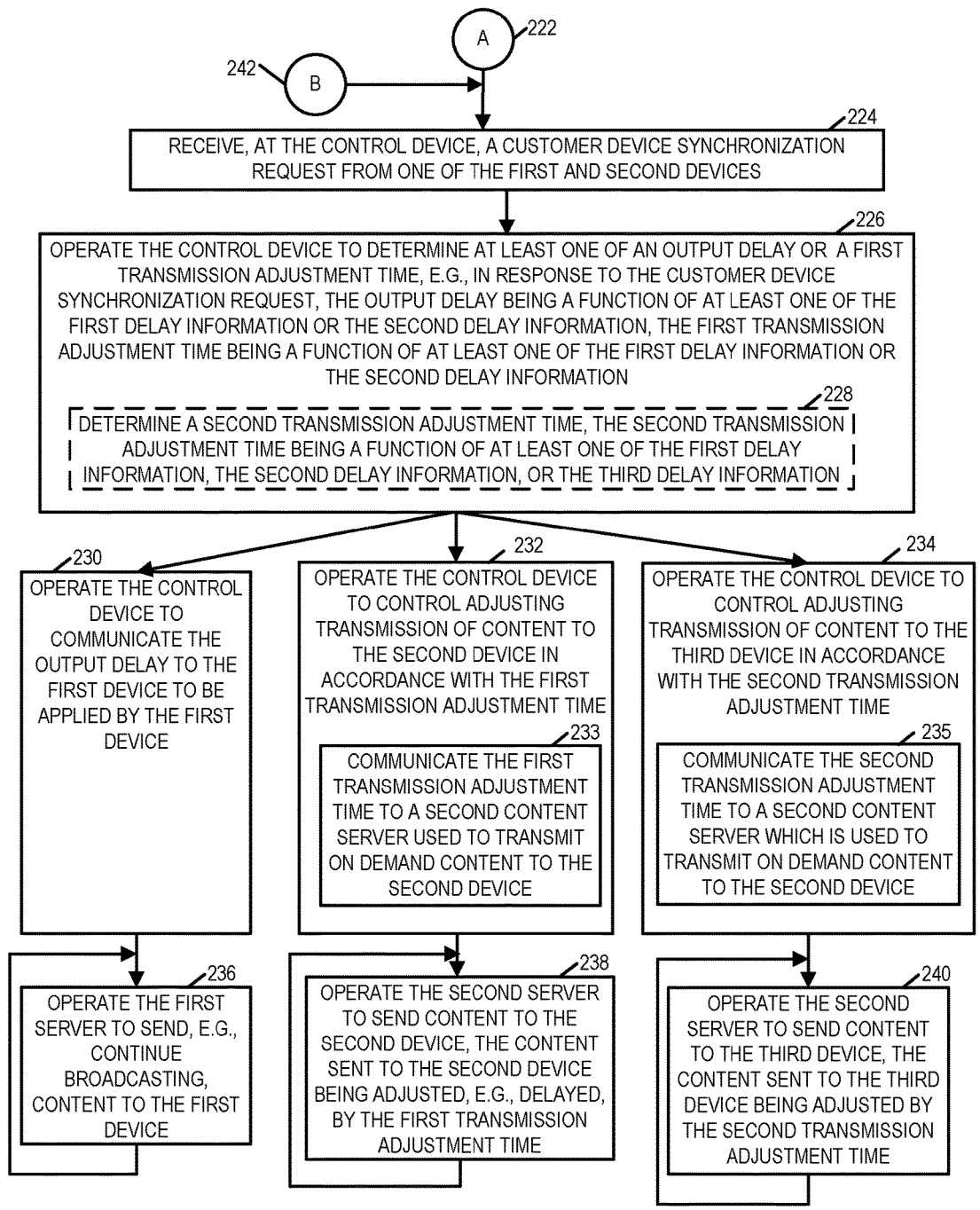
FIG. 2B illustrates a second part of the flowchart showing the steps of the exemplary method of providing content to one or more devices.

FIG. 2, which comprises a combination of FIGS. 2A and 2B, is a flowchart 200 illustrating the steps of an exemplary method of providing content to a viewer, e.g., customer, in accordance with an exemplary embodiment implemented using the system shown in FIG. 1. In some embodiments some of the steps of the method illustrated in FIG. 2 are implemented by the exemplary control server 158 shown in FIG. 1.

Operation starts in step 202, e.g., with one or more elements of the system 100 being initialized. Various steps are performed for at least a customer associated with a customer account. Operation proceeds from start step 202 to step 204. In step 204, information indicating which one of a plurality of devices associated with a first customer account is to serve as a master device for timing synchronization purposes is received. In some embodiments the information is received by the control server 158 from a customer device, e.g., devices 110, 114, 116, 117 or another device such as a PC and need not be from the device serving as the master. In some embodiments the information indicating which one of the plurality of devices is to serve as the master device indicates that a first device, e.g., STB 110, is to serve as the master device.

Operation proceeds from step 204 to step 206. In step 206 the control server 158 receives information from a user corresponding to the first customer account indicating which of the plurality of devices are to be synchronized for content viewing. For example in one scenario the user may specify that the customer device 2, e.g., ROKU box 116, is to serve as the master device and out of the other devices associated with the account, devices 110 and 114 are to be synchronized with the master device for content viewing purposes. While shown as separate steps, in some embodiments the steps 204 and 206 are performed as a single step with the information of steps 204, 206 being received together. In some embodiments the user may send this information while configuring his account's settings and preferences, e.g., using a PC or other device. In some embodiments the information can be provided by the customer over the phone while talking to a service provider's representative in which case the information is in turn sent to the control server 158.

Operation proceeds from step 206 to step 208. In step 208 the received information indicating which of the plurality of devices is the master device and which of the plurality of devices are to be synchronized for content viewing is stored in a customer record, e.g., customer record 1 162, corresponding to the first customer account. In various embodiments the control server 158 has the capability to access and store the received information in the customer record in the database 160.

Operation proceeds from step 208 to step 210. In step 210 a first signal including a first time stamp is sent from a first server to a first device corresponding to the first customer account. The first server is a first content server, e.g., one of the content servers 150 or 154. The first device may be any one of the customer devices 110, 114, 116, 117 associated with the first customer account. For discussion purposes consider that the first server is the broadcast server(s) 150 and the first device is the STB 110. In such a case the first signal is, e.g., a broadcast signal, from the broadcast content server(s) 150, including the first time stamp (T0) indicating the time when the broadcast signal was sent to the first device. In some embodiments the first content server transmits content including the first time stamp in accordance with a broadcast schedule. Thus in some embodiments the first signal includes actual broadcast content corresponding to a program on a channel to which the first device is tuned, in addition to the time stamp. In some other embodiments the first signal including the first time stamp (e.g., a packet) may be a dummy signal, e.g., a test signal, sent to trigger determination and reporting of transmission delay from the broadcast server(s) 150 to the first device. In some embodiments the control server 158 controls the broadcast content server(s) 150 to send the first signal to the first device.

Operation proceeds from step 210 to step 212. In step 212 the control server 158 receives first delay information indicating a first delay (D1) between the time the first signal was sent to the first device and the first signal was received by the first device. In some embodiments the first device is a set top box, e.g., STB 110. In some such embodiments the first delay information is received from the set top box following set top box tuning to one of a broadcast channel or switched digital video channel which communicates content based on a broadcast schedule. In some embodiments upon receiving a broadcast signal including the first time stamp the first device check its time clock, which is synchronized directly or indirectly with the time clock used to generate the first time stamp included in the broadcast signal, and determines the transmission delay between the broadcast server(s) 150 which inserted the first time stamp and first customer device. The determined transmission delay is then reported as the first delay (D1) by the first device to the control server 158 which receives the delay information in step 212.

Operation proceeds from step 212 to step 214. In step 214 a second signal including a second time stamp is sent to a second device corresponding to the first customer account. The second time stamp is the same or different from the first time stamp. While the second device may be any one of the devices 110, 114, 116, 117 associated with the first customer account, for discussion purposes consider that the second device is device 114, e.g., the ROKU box, and has been indicated (e.g., step 206) to be synchronized for content delivery and/or viewing purposes. In some embodiments the second signal to the second device is sent from on demand content server, e.g., VOD server 154. In such a case the second time stamp indicates the time when the second signal was sent from the VOD server 154 to the second device. In some embodiments the second signal includes actual program content in addition to the second time stamp, i.e., the second time stamp may be included in a content stream from the VOD server 154 communicating user requested programming content to the second device. In some other embodiments the second signal including the second time stamp is a dummy signal, e.g., a test signal, which is sent to trigger determination and reporting of transmission delay from the VOD server 154 to the second device. In some embodiments the control server 158 controls the VOD server 154 to send the second signal to the second device.

Operation proceeds from step 214 to step 216. In step 216 the control server 158 receives second delay information indicating a second delay (D2) between the time the second signal was sent to the second device and the second signal was received by the second device. In some embodiments, the second delay (D2) associated with the transmission of the packet including the second time stamp is determined by the second device based on its clock time which is synchronized to the network's reference time and the received second time stamp.

Operation proceeds from step 216 to step 218. In step 218 a third signal including a third time stamp is sent to a third device corresponding to the first customer account. For discussion purposes consider that the third device is device 116, e.g., iPAD, and has been indicated (e.g., step 206) to be synchronized for content delivery and/or viewing purposes. The third customer device 116 also receives the third signal from the VOD server 154 responsible for serving the device 116. In some embodiments the third signal includes actual program content in addition to the third time stamp while in some other embodiments it may be a test signal sent to trigger determination and reporting of transmission delay from the VOD server 154 to the third device 116. Operation proceeds from step 218 to step 220. In step 220 the control server 158 receives third delay information indicating a third delay (D3) between the time the third signal was sent to the third device and the third signal was received by the third device. In various embodiments upon receiving the delay information from the one or more devices the control device updates the customer record corresponding to the reporting devices (e.g., associated with the first customer account) so that the record includes reported transmission delay information. In accordance with the features of the invention the reported delay information is then used, in some embodiments, to calculate transmission delays and/or transmission advancement values that maybe used for synchronizing content delivery to one or more devices which the customer desires to be synchronized.

Operation proceeds from step 220 to step 224 via connecting node A 222. In step 224 the control server receives a customer device synchronization request from one of said first and second devices. In some embodiments the synchronization request is a signal from a customer device requesting activation of synchronized content viewing across multiple devices associated with the customer's account. The synchronization request may be sent by the customer, e.g., by selecting an option available in some embodiments on the program guide and/or by selecting a synchronization option presented to the user at the start or during the presentation of content. In some embodiments the user may send the request prior to watching content of interest and/or when he/she starts watching content and/or any other time during content playback but prior to the user attempting to view the same content on another device which the user desires to be synchronized for content viewing. While a synchronization request may be sent to trigger synchronization of user preferred devices in some embodiments, in some other embodiments the customer may choose to select an automatic synchronization setting which obviates the need to send a synchronization signal. The automatic synchronization setting, which the customer may select and which is then stored in the corresponding customer record, allows synchronized content delivery and/or synchronized content viewing across customer selected devices without the customer having to send the synchronization request.

In various embodiments in response to receiving the synchronization request or based on an automatic synchronization setting, the control device determines, for devices which the customer desires to be synchronized for content viewing, the delays and/or adjustments to be made to achieve desired synchronization. For example the control device in some cases determines, for each device to be synchronized, the amount of delay that should be introduced into the delivery path so that the set of devices to be synchronized have synchronized content delivery.

Operation proceeds from step 224 to step 226. In step 226 the control server determines at least one of an output delay ($\Delta T$) or a first transmission adjustment time ($\Delta T1$). In some embodiments the control server 158 performs this determination in response to receiving the synchronization request or based on an automatic synchronization setting. In some embodiments the output delay is a function of at least one of the first delay information or the second delay information and is calculated based on at least one of the first delay information or the second delay information. In some embodiments the output delay is calculated further based on the third transmission delay information. Similarly in at least some embodiments the first transmission adjustment time, e.g., a transmission delay or advancement value, is calculated based on at least one of the first delay information or the second delay information. In some embodiments the first transmission adjustment time is calculated further based on the third transmission delay information. In some embodiments the second transmission adjustment time is calculated based on at least one of the first delay information, the second delay information or the third delay information. In accordance with one aspect of some embodiments the output delay and/or adjustment determinations are performed based on at least the delay information corresponding to the customer device that the customer has indicated to serve as the master device. To facilitate better understanding of the transmission adjustment time calculations consider an example where the customer indicates that the second customer device 114, e.g., ROKU box, is to serve as the master device and where the reported delay information indicates the following:

First delay D1 (delay between the time the first signal was sent to the first device (e.g., STB 110) and the first signal was received by the first device)=2 seconds.

Second delay D2 (delay between the time the second signal was sent to the second device (e.g., ROKU box 114) and was received by the second device)=4 seconds.

Third delay D3 (delay between the time the third signal was sent to the third device (e.g., iPAD 116) and the third signal was received by the third device)=6 seconds Since the second device 114 serves as the master device, the synchronization should be performed based on the delay information corresponding to the master device, i.e., D2 in the above example, in order to achieve synchronization. For illustration and discussion purposes let the delay corresponding to the master device be denoted by $D_M$. In the above example since the second device 114 serves as the master device, $D_M$=D2. In order to synchronize the content delivery and/or to achieve synchronized content viewing at the customer end, the transmission delays should match. Thus in accordance with one aspect, for each device, adjustment times that may be applied to achieve synchronization are calculated. Continuing with the above example the adjustment time values are calculated as follows:

Output delay time ΔT (delay to be applied by the first device, e.g., STB 110, prior to outputting content to achieve synchronization)=[(master device delay $D_M$)−(D1)];

Thus ΔT=[4]−[2]=2 seconds;

First transmission adjustment time ΔT1 (adjustment, e.g., delay, to be used for adjusting transmission of content to the second device, e.g., ROKU box, to achieve synchronization)

=[(master device delay $D_M$)−(D2)];

Thus ΔT1=[4]−[4]=0 seconds;

Second transmission adjustment time ΔT2 (adjustment, e.g., delay or advancement, to be used for adjusting transmission of content to the third device, e.g., iPAD, to achieve synchronization)

=[(master device delay $D_M$)−(D3)];

Thus ΔT2=[4]−[6]=−3 seconds; where the negative (minus) value indicates that ΔT2 is an advancement value to be used for adjusting transmission time of content to the third device as opposed to delaying, e.g., rather than delaying transmission of content to the third device the start time for content delivery should be advanced.

As should be appreciated, in the above example since the second device 114 serves as the master device, other devices need to be synchronized based on the delay corresponding to the second device 114 (master) and to achieve synchronization no additional delay needs to be applied in the transmission of content to the second device. The example is given just to facilitate an understanding of the determination of transmission adjustment times and output delay (for broadcast receiving devices) and is not limiting in any way. Moreover the delay values in the example are not actual delay values but rather are chosen to present a simple example. Similar calculations are performed in various embodiments in the determination step 226 to determine the output delay and one or more other adjustments (e.g., transmission delays or advancements).

Following the determination of delays, the operation proceeds from step 226 to steps 230, 232 and 234 which are performed in parallel in some embodiments. In step 230 the control device 158 communicates the calculated output delay (e.g., ΔT=2 sec) to the first device (STB 110 in the example) to be applied by the first device prior to outputting content. Operation proceeds from step 230 to step 236. In step 236 the first server, e.g., broadcast content server(s) 150 sends, e.g., continues to broadcast, the content to the first device. In some embodiments the broadcast content server(s) 150 broadcast the content in accordance with the broadcast schedule of the content. In some embodiments the first device, upon receiving broadcast content stream, stores the programming content in a buffer (e.g., time shift buffer) and uses output delay ΔT to control the time at which the buffered programming content is output, e.g., displayed, to the customer in order to achieve synchronized viewing experience across multiple customer devices. In the above example where ΔT=2 sec the STB 110 stores the content in the buffer and rather than initiating the content output immediately upon receipt the STB 110 delays the content output by 2 seconds. Thus in some embodiments the STB 110 buffers received content in memory and delays output of received content by the output delay following receipt of the output delay. The operation continues in this manner with the content server(s) 150 continuing to send the content to the first device.

Returning to step 232. In step 232 the control device 158 controls the second server, e.g., VOD server 154, to adjust transmission of content to the second device by the first transmission adjustment time (ΔT1). Since in the above example the second device 114 serves as the master device, and ΔT1=0 seconds, the control server 158 controls the second server not to apply any additional transmission delay. In some embodiments step 232 of controlling adjusting the transmission includes step 233 wherein the control device communicates the first transmission adjustment time to the second content server, e.g., as a control signal communicating the first transmission adjustment time (ΔT1) for use by the second content server in adjusting the transmission of content to the second device in order to achieve synchronized content delivery. Operation proceeds from step 232 to step 238. In step 238 the second server, e.g., VOD server 154 sends the content to the second device 114, the content sent to the second device 114 being adjusted by the first transmission adjustment time (ΔT1). Since in the above example the VOD server is instructed by the control server 158 to apply ΔT1=0, the VOD server 154 ultimately does not apply any additional transmission delays in sending the content to the second device 114. In some embodiments the content servers 150, 154 send the content to the first device and the second device in parallel. The operation continues in this manner with the content server 154 continuing to send the content to the second device.

Returning to step 234. In step 234 the control device 158 controls the second server, e.g., VOD server 154, to adjust transmission of content to the third device, e.g., iPAD 116, by the second transmission adjustment time (ΔT2). In some embodiments step 234 of controlling adjusting the transmission includes step 235 where the control device communicates the second transmission adjustment time to the second content server, e.g., as a control signal communicating the second transmission adjustment time (ΔT2) for use by the second content server in adjusting the transmission of content to the third device in order to achieve synchronized content delivery. Operation proceeds from step 234 to step 240. In step 240 the second server, e.g., VOD server 154, sends the content to the third device 116, the content sent to the third device 116 being adjust, e.g., advanced or delayed, by the second transmission adjustment time (ΔT2). Since in the above example ΔT2=−3, instead of delaying transmission the control server 158 instructs the VOD server to advance the content transmission time by "3 seconds" in order to achieve synchronized delivery with respect to the master device. Thus in the example the VOD server 154 moves the transmission start time of the content stream to the third device 116, three seconds ahead of the transmission of content to the second device. In some embodiments the content is sent to at least two of the first, second, or third devices in parallel, content sent to at least one of the devices being delayed (or adjusted) by the first transmission adjustment time or the second transmission adjustment time. The operation continues with the content server continuing to send the content to the third device.

In the above discussion while the term transmission delay time is used, in some embodiments the adjustments made to achieve synchronization may rather involve advancing the delivery start time of content streams to one or more devices. In such embodiments when the determinations, (e.g., step 226) performed by the control device 158 based on the reported delay information corresponding to various customer devices, indicate that to achieve synchronized viewing experience relative to a master device the delivery of content streams to one or more devices need to be advanced, the control device 158 instructs the content server serving the corresponding customer devices to advance the start time for content delivery to such devices so that synchronization in accordance with the invention can be achieved. In some embodiments different types of content streams may support different formats of content. Different types of content streams may be suitable for different types of services and/or different types of playback devices. For example, some versions of the program may be formatted for a particular frame rate which is supported by some devices but not others.

Figure 3:
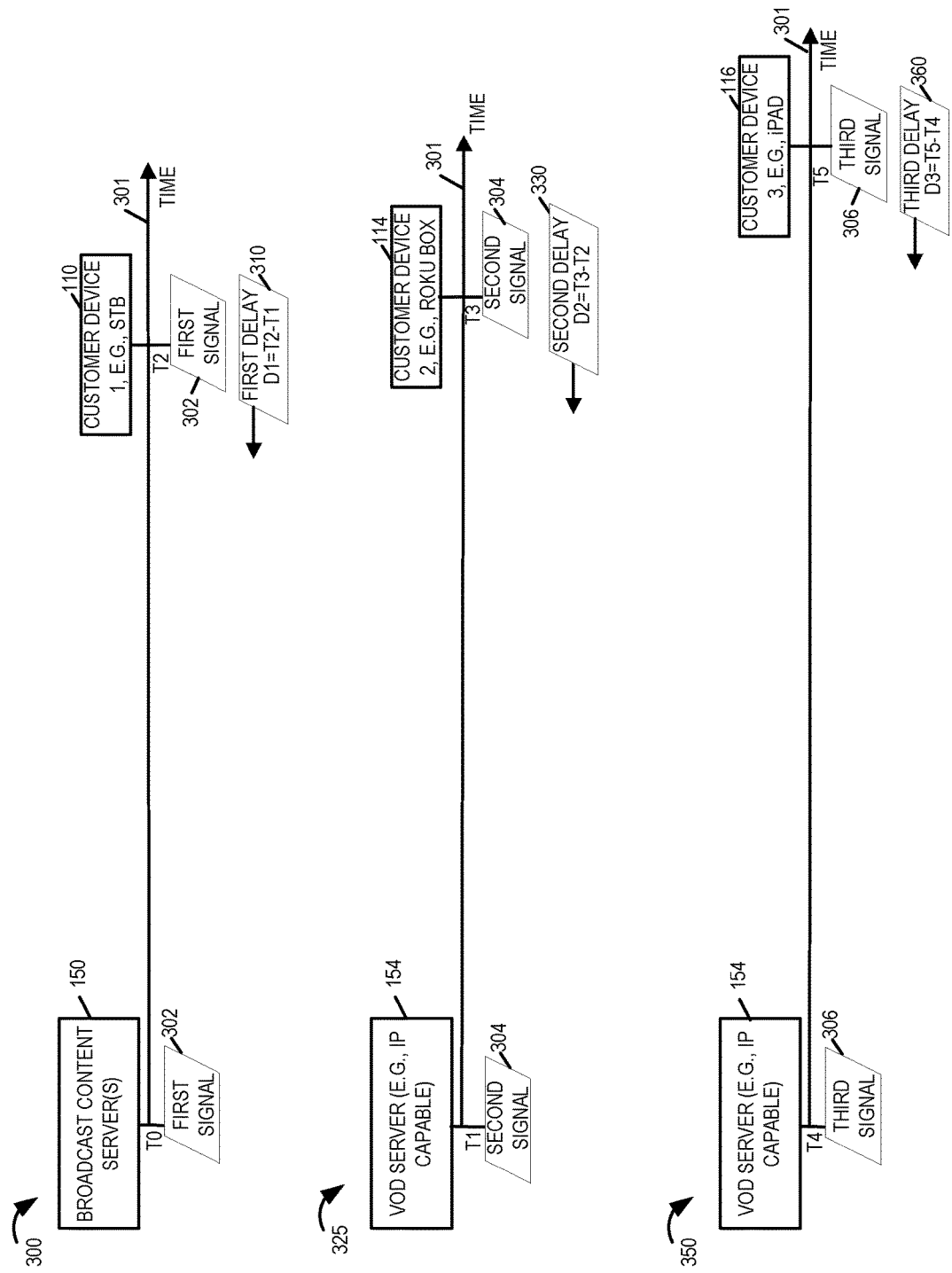
FIG. 3 illustrates an example showing transmission and reception of exemplary first, second and third signals by the devices of system 100.

FIG. 3 illustrates an example showing transmission and reception of exemplary first, second and third signals by the devices of system 100. Drawing 300 of FIG. 3 shows a time axis 301 which is used to illustrate transmission timing of a first signal 302, e.g., broadcast content stream, from the first server, e.g., broadcast content server(s) 150, and the reception of the first signal 302 at the first device 110. As can be seen in drawing 300 the time of transmission of the first signal 302 from the broadcast content server(s) 150 is indicated as T0 while the time at which the first signal is received at the first device 110 is indicated as T2. The first delay D1 indicates the delay between the transmission and reception of the first signal in the delivery path. In various embodiments the first signal 302 includes a first time stamp indicating transmission time T0. In accordance with one feature of some embodiments the first device calculates the first delay D1 as D1=[T2]−[T0], and reports the first delay D1 310 to the control server 158.

Drawing 325 of FIG. 3 shows the transmission timing of a second signal 304, e.g., unicast IP content stream, from a second server, e.g., VOD server 154, and the reception of the second signal 304 at the second device 114. As can be seen in drawing 325 the time of transmission of the second signal 304 from the VOD server 154 is indicated as T1 while the time at which the second signal is received at the second device 114 is indicated as T3. The second delay D2 indicates the delay between the transmission and reception of the second signal 304 in the delivery path between the VOD server 154 and the second device 114. In various embodiments the second signal 304 includes a second time stamp indicating transmission time T1. In accordance with one feature of some embodiments the second device calculates the second delay D2 as D2=[T3]−[T1], and reports the delay D2 330 to the control server 158.

Drawing 350 of FIG. 3 shows the transmission timing of a third signal 306, e.g., unicast IP content stream, from the second server, e.g., VOD server 154, and the reception of the third signal 306 at the third device 116. As can be seen in drawing 350 the time of transmission of the third signal 306 from the VOD server 154 is indicated as T4 while the time at which the third signal 306 is received at the third device 116 is indicated as T5. The third delay D3 indicates the delay between the transmission and reception of the third signal 306 in the delivery path between the VOD server 154 and the third device 116. In various embodiments the third signal 306 includes a third time stamp indicating transmission time T4. In accordance with one feature of some embodiments the third device 116 calculates the third delay D3 as D3=T5−T4, and reports the delay D3 360 to the control server 158.

In various embodiments the control server 158, upon receiving the delay information from the one or more devices, updates the customer record corresponding to the reporting devices 110, 114, 116. In some embodiments the reported delay time information is then used to calculate transmission adjustments, e.g., transmission delay and/or advancement values, that maybe used for synchronizing content delivery to one or more devices which the customer desires to be synchronized.

Figure 4:
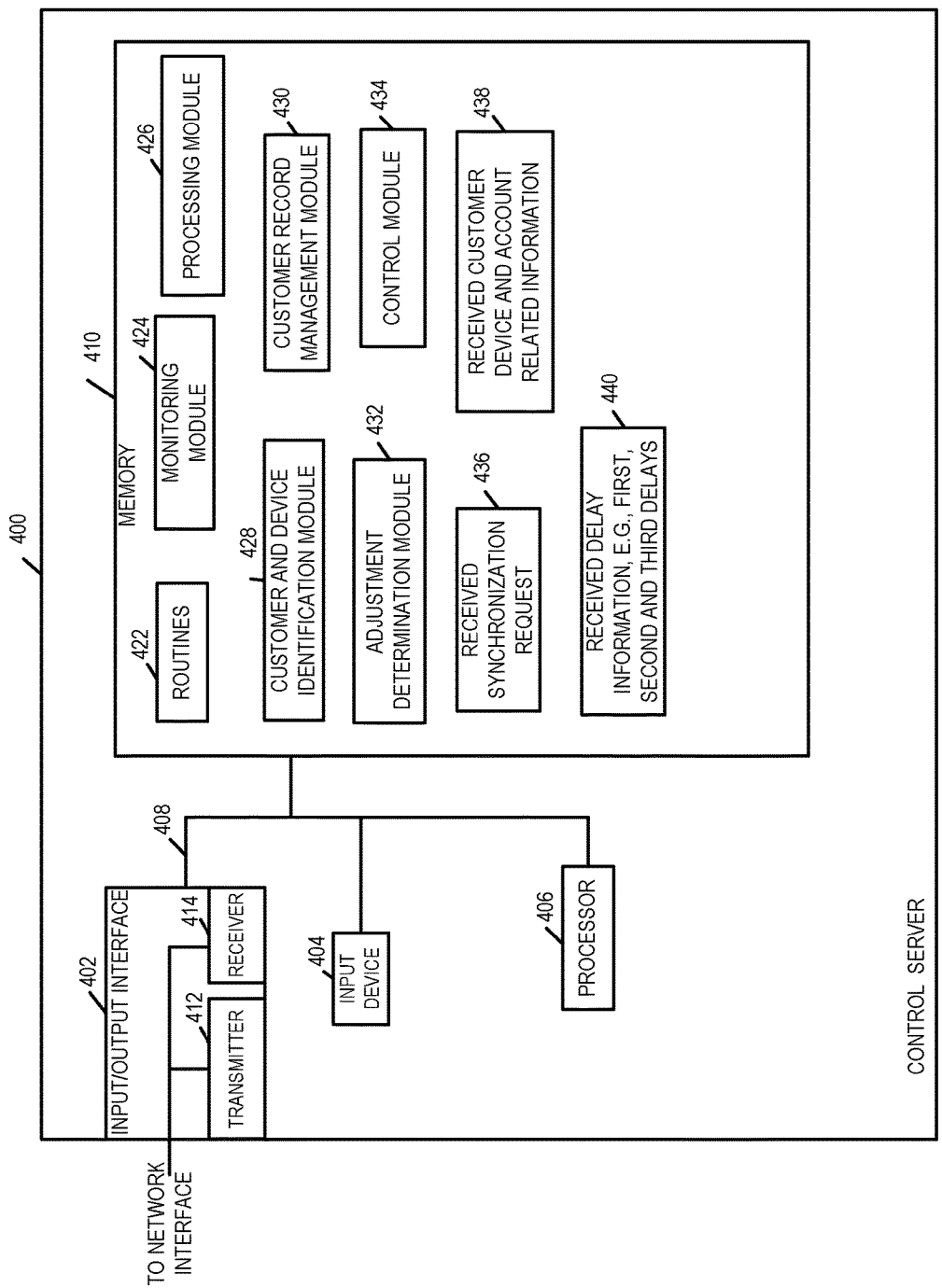
FIG. 4 illustrates an exemplary control server implemented in accordance with some exemplary embodiments.

FIG. 4 illustrates an exemplary control server 400 implemented in accordance with an exemplary embodiment. The exemplary control server 400 can be, and in some embodiments is, used as the control server 158 shown in FIG. 1. In some embodiments the control server 400 is configured to implement at least some of the steps of the method of flowchart 200. In accordance with one aspect of some embodiments the exemplary control server 400 facilitates achieving synchronized content viewing across a plurality of devices associated with a customer account in accordance with the features of the invention.

As shown, the control server 400 includes an input/output (I/O) interface 402, an input device 404, a processor 406, and a memory 410 coupled together via a bus 408. The various elements of the control server 400 can exchange data and information over the bus 408.

The I/O interface 402 includes a transmitter 412 and a receiver 414. In some embodiments via the I/O interface 402 the control server 400 is coupled to the network interface 168 of the headend 102 via which information is communicated with the devices located at the customer premises over communications network 170. Furthermore via the I/O interface 402, the control server 400 can exchange signals and/or information with other devices and/or system elements such as the servers in the network headend 102 over the local network 166 of system 100.

The input device 404 may be a keypad, touch screen, and/or other device for receiving and processing input commands/instructions. The processor 406, e.g., a CPU, executes control routines 422 and one or more modules to control the control server 400 to operate in accordance with the invention and implement one or more steps of the method of flowchart 200. Thus to control the operation of control server 400, the processor 406 uses information, various modules and/or routines including instructions stored in memory 410.

In addition to the routines 422, the memory 410 includes a monitoring module 424, a message processing module 426, a customer and device identification module 428, a customer record management module 430, an adjustment determination module 432, a control module 434, received synchronization request 436, received customer device and account related information 438, and received delay information 440.

Routines 422 include communications routines and/or device control routines. The monitoring module 424 is configured to monitor for messages and/or signals from other devices, e.g., customer premise devices located at customer premises as well as other devices at the headend or located externally. In various embodiments the monitoring module 424 is configured to monitor for signals from one or more customer devices, e.g., synchronization requests, signals indicating delay information and/or other information.

In various embodiments the control server 400 is configured to receive, e.g., via the receiver 414 of interface 402, information indicating which one of a plurality of devices associated with a first customer account is to serve as a master device for timing synchronization purposes, and information from a user corresponding to the first customer account indicating which of said plurality of devices are to be synchronized for content viewing. The information may be received from one of the devices associated with a first customer account or another device. In some embodiments this received information is stored in the control device 400 as received customer device and account related information 438. In various embodiments the control server 400 is configured to receive, e.g., via the receiver 414 of interface 402, first delay information indicating a first delay between the time the first signal was sent to a first customer device, e.g., STB 110, and the first signal was received by the first customer device. In various embodiments the control server 400 is further configured to receive, e.g., via the receiver 414 of interface 402, second delay information indicating a second delay between the time the second signal was sent to the second device and the second signal was received by the second device, and third delay information indicating a third delay between the time the third signal was sent to the third device and the third signal was received by the third device. The received delay information may be stored in memory 410 as received delay information 440. In some embodiments the control server 400 is configured to receive, e.g., via the receiver 414 of interface 402, a synchronization request from a customer device. In some embodiments the control server 400 receives a synchronization request 436 from one of the first and second customer devices.

The processing module 426 is configured to process various messages and/or signals, e.g., such as the synchronization request, delay information and/or other signals from devices, received by the control device 400, e.g., via the interface 402, and recover information. In various embodiments the processing module 426 is configured to process the received messages and/or signals and provide recovered information to the processor 406 and/or one or more other modules to take further action in response to the received signals.

The customer and device identification module 428 is configured to identify a customer and customer device from which a signal, e.g., synchronization request and/or other signals communicating customer account, preference or device related information. In some embodiments the identification module 428 uses information included in a received signal to identify the customer device from which the signal is received. In some embodiments the control server 400 may seek customer information from the customer database 160 in order to identify the customer associated with the customer premise device.

The customer record management module 430 is configured to control storage of customer related information received by the control server 400 in a corresponding customer record as well responsible for updating information in the customer record based on changes. In various embodiments the customer record management module 430 is configured to control storage of received information indicating which of the plurality of devices is the master device and which of the plurality of devices are to be synchronized for content viewing in a customer record, e.g., customer record 162 in database 160, corresponding to the first customer account. In some embodiments the customer record management module 430 is further configured to control storage of the received delay information 440 in the in a customer record corresponding to the first customer account.

The adjustment determination module 432 is configured to determine at delays and/or adjustments to be applied by the content servers and/or by the customer device to achieve synchronized content viewing experience across multiple devices in accordance with the features of the invention. In some embodiments the adjustment determination module 432 performs delay determinations based at least on the delay information corresponding to the customer device that the customer has indicated to serve as the master device. In some embodiments the adjustment determination module 432 is configured to determine least one of an output delay ($\Delta T$) or a first transmission adjustment time ($\Delta T1$). In some embodiments the adjustment determination module 432 is configured to determine the output delay based on at least one of the first delay information or the second delay information or the third transmission delay information. In some embodiments the adjustment determination module 432 performs the determination in response to the control server 400 receiving the synchronization request or based on an automatic synchronization setting. In some embodiments the adjustment determination module 432 is configured to determine the first transmission adjustment time based on at least one of the first delay information or the second delay information or the third transmission delay information. In some embodiments the second transmission adjustment time is calculated based on at least one of the first delay information, the second delay information or the third delay information. Thus it should be appreciated that the adjustment determination module 432 performs the functions corresponding to step 226 of flowchart 200.

The control module 434 is configured to control the control server 400 to communicate, e.g., via interface 402, the output delay to the first device to be applied by the first device prior to outputting content. In some embodiments the control module 434 is configured to the control adjusting transmission of content to the second device by the first transmission adjustment time (e.g., determined by the determination module 432). In some such embodiments the control module 434 is configured to communicate, e.g., via the interface 402, the first transmission adjustment time to the second content server (e.g., VOS server 154) which is used to transmit content to the second device, as part of being configured to control adjusting, e.g., delay or advance, transmission of content to the second device by the first transmission adjustment time. In some embodiments the control module 434 is configured to control adjusting transmission of content to the third device by the second transmission adjustment time. Thus in various embodiments the control module 434 communicates delays to a customer device, e.g., STB 110, and controls delaying or otherwise adjusting, e.g., advancing, the transmission of content by one or more content servers to the customer devices to achieve synchronization.

The modules discussed above and/or shown in the figure may be implemented in software, hardware or as a combination of hardware and software. The modules are sometimes are implemented in hardware. In other embodiments, the modules may, and sometimes are, implemented as software modules including processor executable instructions which when executed by the processor of the device cause the device to implement the corresponding step or operation. In still other embodiments, some or all of the modules are implemented as a combination of hardware and software.

In some embodiments the modules of the present invention are implemented in hardware, e.g., as application-specific integrated circuits (ASICs) or other circuits. In such embodiments the modules are implemented in a circuit. Thus in at least some embodiments the implementation is made fully in hardware. In some embodiments various modules in the control device 400 are implemented fully in hardware, e.g., as individual circuits, within a processor of the device 400. In other embodiments some of the modules are implemented, e.g., as circuits, within the device processor with other modules being implemented, e.g., as circuits, external to and coupled to the processor. In some other embodiments rather than being implemented as circuits, all or some of the modules may be implemented in software and stored in the memory of the device 400, with the modules controlling operation of the corresponding device to implement the functions corresponding to the modules when the modules are executed by a processor, e.g., such as processor 406 of device 400.

While the control server 400 in FIG. 4 is shown to include a single processor, e.g., computer, within the device, it should be appreciated that the processor may be implemented as one or more processors, e.g., computers. When implemented in software, the modules include code, which when executed by the processor of the device 400, configure the processor, e.g., computer, to implement the function corresponding to the module. In some embodiments, the processor included in the corresponding device is configured to implement each of the modules. As should be appreciated, the modules included in the control server 400 illustrated in FIG. 4 control and/or configure the control server 400 or elements therein such as the corresponding processor to perform the functions of corresponding steps illustrated and/or described in the method of flowchart 200.

Figure 5:
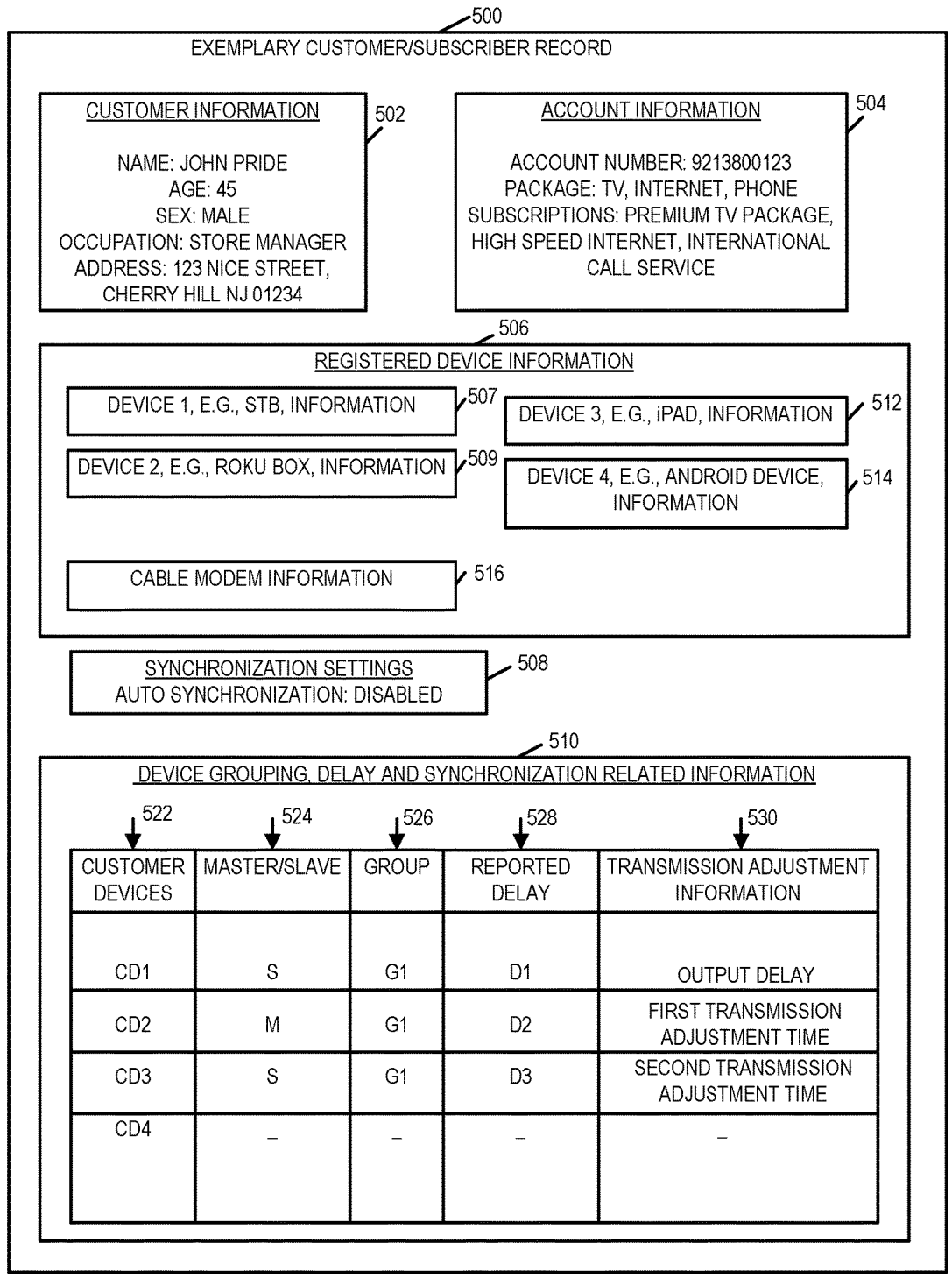
FIG. 5 illustrates an exemplary customer/subscriber record corresponding to an exemplary customer account and/or household.

FIG. 5 illustrates an exemplary customer/subscriber profile 500 corresponding to an exemplary customer account. While a customer account may be associated with multiple customer records/profiles, e.g., corresponding to different members of the household, the example of FIG. 5 shows a single customer record corresponding to an individual. The customer record 500 may be used as any one of the customer records shown in FIG. 1, e.g., as customer 1 record 162.

In some embodiments the customer record embodiments the exemplary customer record 500 is generated by the control server 158 based on information provided to and/or obtained by the control server 158. In some embodiments the generated customer record 500 or a subset of the customer record 500 is sent, e.g., unicast, to one or more customer devices associated with the customer account to which the customer record 500 corresponds. Thus in some embodiments the customer record or a portion of the record 500 maybe stored on one or more customer devices as well. In various embodiments the customer record 500 is periodically updated, e.g., through signaling exchange between the customer devices and the control server 158.

The exemplary subscriber profile 300 includes various sets of information including customer information 502, account information 504, registered device(s) information 506, synchronization settings 508 and device grouping and delay related information 510.

Customer information 502 includes information regarding the individual customer/subscriber to which the customer record 500 corresponds. Customer information 502 includes customer's name, age, sex, occupation, and address information etc. In the example the customer information 502 includes a name field indicating that customer name is JOHN PRIDE, age field indicating that age is 45 years, sex field indicating the gender as a male, occupation field indicates store manager as the occupation and address field indicates the service address, e.g., home address.

Account information 504 includes account related information including account number shown as "9213800123" in the example, packages/bundles subscribed by the customer, additional premium subscription services taken by the customer including premium TV channel package, high speed internet, international/long distance calling service etc.

Registered device information 506 includes information regarding various devices associated with the customer/customer account and registered at the service provider headend 102. Registered device information 506 includes information 507 that includes information regarding device 1, e.g., a set top box, associated with the customer, information 509 that includes information regarding device 2, e.g., ROKU box, associated with the customer, information 512 that includes information regarding device 3, e.g., an iPAD, associated with the customer, information 514 that includes information regarding device 4, e.g., an ANDROID device such as a Smartphone, associated with the customer and cable modem information 516 that includes information regarding the cable modem installed at the customer premise corresponding to the customer/customer account. Each of the device information sets 507, 509, 512, 514 and 516 include information indicating device identifiers/MAC addresses or other identifiers associated with the corresponding device, capability information indicating the individual device's capability, such as for example, the data rates, formats, protocols etc. supported by the device. The synchronization settings indicate whether the auto synchronization feature is enabled or disabled. When enabled the auto synchronization feature allows the customer preferred devices, e.g., customer selected devices, to synchronize in a way as to allow the customer to have synchronized content viewing experience across the selected devices. When the auto synchronization setting is enabled the synchronization across selected devices occurs automatically without the customer having to send a synchronization request from a customer device. However when the auto synchronization setting is disabled, a synchronization request from a customer device should be sent to activate synchronization across selected devices. In some embodiments the customer is presented an option, e.g., while viewing content, to enable auto synchronization. In some embodiments the auto synchronization is set on disabled by default initially.

Device grouping, delay and synchronization information 510 is shown in tabular form and includes information indicating devices which the customer has selected to be grouped for synchronization, master and slave relationship between device selected for synchronization, received delay information reported by one or more devices, and transmission adjustments, e.g., delay or advancement values, calculated for achieving synchronization.

Column 522 includes information identifying various customer devices with each row indicating a customer device, e.g., customer device 1 (CD1), customer device 2 (CD2), customer device 3 (CD3) and customer device 4 (CD4). Column 524 indicates master/slave relationship between the devices selected by the user for synchronization. The device selected by the customer to be considered the master device for synchronization purposes is indicated by letter "M" in the row corresponding to the device while the device(s) which are to be considered slave are indicated by the letter "S" in the rows corresponding to the device(s). The master-slave relationship is assigned by the customer and communicated from a customer device to the control server 158 in some embodiments. For example in the customer record 500 it can be seem that customer has indicated that device 2 (CD2), e.g., ROKU box, is to be considered the master for synchronization purposes while devices CD2 and CD3 are to be considered slave. Column 526 includes information indicating a group "G1" of devices to which a device identified in the corresponding row belongs. The letter G1 indicates the group of customer selected devices for synchronization. In the example of customer record 500 it can be seen that customer devices CD1, CD2 and CD3 are group members while device 4 (CD4) is not a member. Customer device 4 (CD4) for which no information is indicated in the columns 524 and 526 is not a member of the user selected group of devices which are desired to be synchronized for content viewing.

Column 528 indicates reported delay information corresponding to each device identified in the corresponding row. In some embodiments the delay information is reported by each device to which the delay information corresponds and is then stored in the customer record 500. In the customer record 500 it can be seen that delay corresponding to device CD1 is reported as D1 (e.g., first delay D1 between the time a first signal was sent to the first device CD1 (e.g., STB 110) and the first signal was received by the first device). Similarly delay corresponding to device CD2 is reported as D2 (e.g., second delay D2 between the time the second signal was sent to the second device (e.g., ROKU box 114) and was received by the second device) and delay corresponding to device CD3 is reported as D3 (e.g., third delay D3 between the time the third signal was sent to the third device (e.g., iPAD 116) and the third signal was received by the third device).

Column 530 indicates various adjustments calculated by the control server 158 and stored in the customer record 500 in some embodiments. Each entry in column 530 corresponds to an adjustment, e.g., delay or advancement, applicable for the device identified in the corresponding row. The output delay indicates a delay to be applied by a device receiving content broadcast (e.g., STB 110), which in the present example is the first device CD1, prior to outputting content to achieve synchronization. The first transmission adjustment time indicates adjustment, e.g., a delay or advancement, to be used for adjusting transmission of content to the second device CD2 of the selected group of devices, to achieve synchronization. The second transmission adjustment time indicates the adjustment, e.g., delay or advancement, to be used for adjusting transmission of content to the third device CD3, e.g., iPAD, to achieve synchronization.

Various other information fields indicating subscriber's preferences, viewing habits, internet surfing habits, favorite movies/shows etc., may and in some embodiments are, included in the customer record 500. Such information fields can also be used to target specific applications and/or advertisement campaigns to the subscriber.

Figure 6:
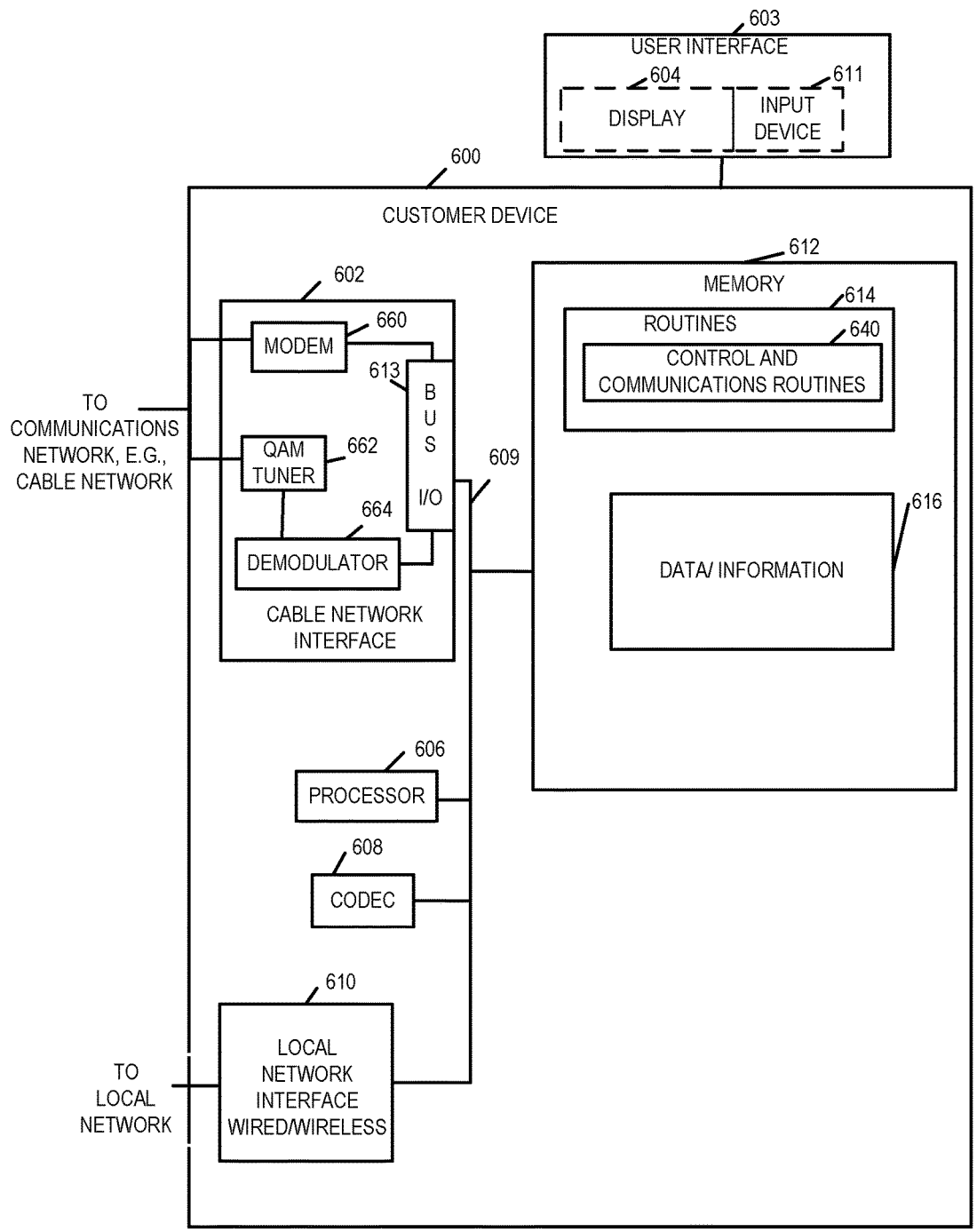
FIG. 6 illustrates an exemplary customer premise device implemented in accordance with one exemplary embodiment.

FIG. 6 illustrates an exemplary customer premise device 600 implemented in accordance with one exemplary embodiment. The customer premise device 600 may be used as any of any one of the devices shown in FIG. 1. In various embodiments the customer device 600 is configured report delay information in accordance with the features of the invention. In some embodiments, where the customer device 600 is a set top box receiving broadcast content, the customer device 600 is configured to receive output delay information from the control server and delay content output, e.g., to a display device, in order to facilitate synchronized content viewing across devices in accordance with the features of the invention.

As shown in FIG. 6, in some embodiment the customer premise device 600 includes and/or is coupled to a user interface 603 which includes a display device 604, e.g. a monitor and/or a Television (TV) and an input device 611. The customer premise device 600 further includes a cable network interface 602, a local network interface 610, a processor 606, a codec (Coder/Decoder) 608, and a memory 612 coupled together via a bus 609. The various elements of the content playback device 600 can exchange data and information over the bus 609. The input device 611 may be a keypad, touch screen sensor, and/or a microphone for receiving and processing customer input commands.

Via the cable network interface 602, the customer premise device 600 can exchange signals and/or information with other devices and/or system elements such as the servers in the network headend 102, over the cable network 170. The cable network interface 602 supports the receipt and/or transmission of content and/or other information from/to different servers, e.g., the content server(s), control server, etc. The cable network interface 602 in some embodiments also includes, e.g., an infrared (IR) or other radio signal receiver to receive signals from a user remote control device. The cable network interface 602 includes a modem 660, e.g., cable modem, which supports receiving content, a QAM tuner 662 and a demodulator 664. The QAM tuner 662 receives programming content, e.g., broadcast content, from a channel to which the content playback device 600 tunes. The demodulator 664 demodulates the received content and/or information. The elements of the interface 602 are coupled via a bus interface 613 to the device bus 609.

The local network interface 610 maybe a wired interface, e.g., Ethernet interface, or wireless interface such as, e.g., a Wi-Fi® interface, Bluetooth® interface, etc. Via the local network interface 610 the customer device 600 is coupled to the local network, e.g., home network 120, and can receive/transmit information. The local network interface 610 supports the receipt and/or transmission of content and/or other information over the local network 120.

The processor 606, e.g., a CPU, executes routines 614 and uses data/information 616 to control the customer device 600 to operate in accordance with the invention. The processor 606 is responsible for controlling the operation of the customer device 600 including, e.g., reporting delay information and controlling the content output in accordance with an output delay to synchronize content viewing. In various embodiment the processor 606 is configured to perform functions that have been discussed as being performed by a customer device. The Codec 608 is capable of performing encoding and/or decoding operations on a digital data stream or signal.

Routines 614 include communications routines and/or device control routines 640. Data/information 616 includes information that can be used to control device operation. To control the customer device 600, the processor 606 uses information 616 and/or routines including instructions stored in memory 612. While the customer device 600 in FIG. 6 is shown to include a single processor, e.g., computer, within the device, it should be appreciated that the processor may be implemented as one or more processors, e.g., computers.

Figure 7:
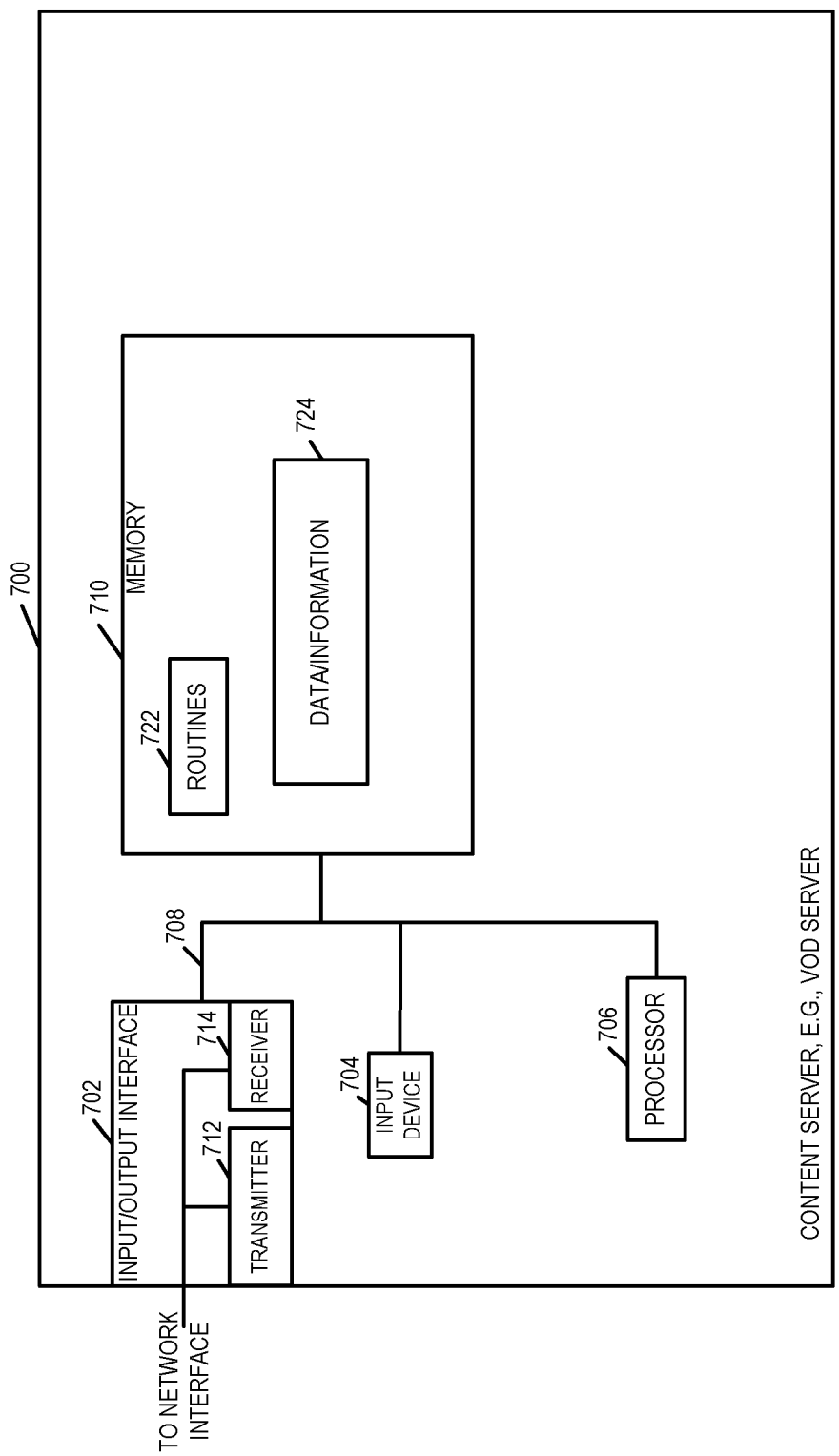
FIG. 7 illustrates an exemplary content server implemented in accordance with an exemplary embodiment.

FIG. 7 illustrates an exemplary content server 700 implemented in accordance with an exemplary embodiment. The exemplary content server 700 can be, and in some embodiments is, used as the VOD content server 154 of FIG. 1. In some embodiments the content server 700 is configured to implement at least some of the steps of the method of flowchart 200. In accordance with one aspect of some embodiments the exemplary content server 700 facilitates content delivery to a device synchronized with delivery of content to one or more other devices in accordance with the features of the invention.

As shown, the content server 700 includes an input/output (I/O) interface 702, an input device 704, a processor 706, and a memory 710 coupled together via a bus 708. The various elements of the content server 700 can exchange data and information over the bus 708.

The I/O interface 702 includes a transmitter 712 and a receiver 714. In some embodiments via the I/O interface 702 the content server 700 is coupled to the network interface 168 of the headend 102 via which information is communicated with the devices located at the customer premises over communications network 170. Furthermore via the I/O interface 702, the content server 700 can exchange signals and/or information with other devices and/or system elements such as the servers in the network headend 102 over the local network 166 of system 100.

The input device 704 may be a keypad, touch screen, and/or other device for receiving and processing input commands/instructions. The processor 706, e.g., a CPU, executes control routines 722 and use data/information 724 to control the content server 700 to operate in accordance with the invention and perform one or more steps including, e.g., send a second signal including a second time stamp to a second device corresponding to a first customer account, receive adjustment information from the control server 400, adjust transmission timing of content from the content server in accordance with the adjustment information and transmit content to one or more customer devices.

Routines 722 include communications routines and/or device control routines. Data/information 724 includes information that can be used to control content server 700 operation. To control the operation of content server 700, the processor 706 uses data/information 724 and routines including instructions stored in memory 710. While the content server 700 in FIG. 7 is shown to include a single processor, e.g., computer, within the device, it should be appreciated that the processor may be implemented as one or more processors, e.g., computers.

An exemplary system for providing content to one or more devices, comprises: a first server including a first processor configured to send, via a first interface, a first signal to a first device corresponding to a first customer account, said first signal including a first time stamp; a control device including a communication interface configured to receive first delay information indicating a first delay between the time the first signal was sent to the first device and the first signal was received by the first device; a second server including a second processor configured to send, via a second interface, a second signal including a second time stamp to a second device corresponding to the first customer account, said second time stamp being the same or different from said first time stamp. In some embodiments the communication interface of the control device is further configured to receive second delay information indicating a second delay between the time the second signal was sent to the second device and the second signal was received by the second device. In some embodiments the control device further includes a control module configured to perform at least one of: i) control communicating an output delay to said first device to be applied by said first device prior to outputting content, said output delay being a function of at least one of said first delay information or said second delay information or ii) control adjusting transmission of content to said second device by a first transmission adjustment time, said first transmission adjustment time being a function of at least one of said first delay information or said second delay information. In some embodiments the first server is a first content server which transmits content including said first time stamp in accordance with a broadcast schedule. In some embodiments the second server is an on demand content server.

In some embodiments the communication interface of said control server is further configured to receive information indicating which one of a plurality of devices associated with the first customer account is to serve as a master device for timing synchronization purposes. In some embodiments the information indicating which one of the plurality of devices is to serve as the master device indicates that the first device is to serve as the master device. In some such embodiments the communication interface of said control server is further configured to receive information from a user corresponding to said first customer account indicating which of said plurality of devices are to be synchronized for content viewing. In some embodiments the control server further includes a customer record management module configured to control storage of information indicating which of the plurality of devices is the master device and which of the plurality of devices are to be synchronized for content viewing storing, in a customer record corresponding to said first customer account.

In some embodiments the first device is a set top box, and the first delay information indicating the first delay between the time the first signal was sent to the first device and the first signal was received by the first device is received from the set top box following set top box tuning to one of a broadcast channel or switched digital video channel which communicates content based on a broadcast schedule. In some such embodiments the control module is configured to control the control server to communicate the output delay to said set top box. In some embodiments the set top box buffers received content in memory and delays output of received content by the output delay following receipt of the output delay.

In some embodiments the control module is configured to control adjusting transmission of content to the second device by a first transmission delay time. In some embodiments to control adjusting transmission of content to the second device the control module is configured to communicate the first transmission delay time to the second content server which is used to transmit on demand content to the second device.

In some embodiments the second processor is further configured to send, via the second interface, a third signal including a third time stamp to a third device corresponding to the first customer account. In some such embodiments the communication interface of the control device is further configured to receive third delay information indicating a third delay between the time the third signal was sent to the third device and the third signal was received by the third device. In some embodiments the control module is further configured to control adjust transmission of content to the third device by a second transmission delay time, said second transmission delay time being a function of at least one of said first delay information, said second delay information or said third delay information.

In some embodiments the control server is configured to control the first and second servers to send content to said first and second devices in parallel. In some embodiments the control server is configured to control the first and second servers to send content to at least two of said first, second, or third devices in parallel with the content sent to at least one of the devices being delayed by the first transmission delay time or the second transmission delay time.

In some embodiments the control server is configured to receive, via the communication interface, a customer device synchronization request from one of said first and second devices. In some embodiments the control server is configured to determine at least one of said output delay or first transmission delay time in response to said customer device synchronization request. In some such embodiments the control module is configured to perform, in response to the received customer device synchronization request, at least one of: i) control communicating the output delay to said first device to be applied by said first device prior to outputting content or ii) control adjusting transmission of content to said second device by the first transmission delay time.

In the present application it should be appreciated that content can include video content such as TV programs, movies, news, etc. and/or audio content such as radio programs or music channels.

Various features of the embodiments of the present invention provide consistent user experience across multitude of video products and devices. A service provider, e.g., cable service provider, offers its costumers access to variety of products, e.g., content services, in many different formats and types. Same movie/show title can be viewed on the TV screen using a QAM Set-top box or on any variety of IP enabled companion devices, such as iPAD, Android tablet, PC browser, smart TV, gaming station and more. As the service provider allows its customers to go from one device to another or from type to type, for their video consumption, the features of the present allow the service provider to offer the customer a way to seamlessly move from watching content on one device to another without losing continuity thus allowing a synchronized viewing experience across multiple customer preferred devices associated with the customer account.

Various features of the invention work across a variety of different kinds of devices including iOS and Android based devices, internet capable SmartTVs, gaming consoles, streaming devices such as Roku box, STBs etc., as well as across various stream types including, e.g., Quadrature amplitude modulated (QAM) streams, HTTP Live Streaming (HLS), HTTP Live Streaming (HSS), Live, On-Demand, Free, Premium etc. The features of the present invention cover adaptive bit rate (ABR) video streams as well as streams on QAM transport.

Various embodiments have been discussed above. It should be appreciated that the invention is not intended to be limited by the exemplary embodiments which are to facilitate an understanding of the invention and its many possible applications.

In various embodiments system elements described herein are implemented using one or more modules which are used to perform the steps corresponding to one or more methods of the present invention. In various embodiments a device of any of one or more of Figures, e.g., control server or other device, includes a module corresponding to each of the individual steps and/or operations described with regard to any of the Figures in the present application and/or described in the detailed description of the present application.

In the above described methods, in some embodiments, each step may be performed by one or more different software instructions executed by a computer processor, e.g., a central processing unit (CPU). At least one system implemented in accordance with the present invention includes a means for implementing each of the various steps which are part of the methods of the present invention. Each means may be, e.g., an instruction, processor, hardware circuit and/or combination of elements used to implement a described step.

Many of the above described methods or method steps can be implemented using machine, e.g., computer, executable instructions, such as software, included in a non-transitory machine, e.g., computer, readable medium used to control a machine, e.g., general purpose computer with or without additional hardware, to implement all or portions of the above described methods, e.g., in one or more nodes. The machine readable medium may be, e.g., a memory device, e.g., RAM, floppy disk, etc. Accordingly, among other things, the present invention is directed to a machine-readable medium including machine executable instructions for causing a machine, e.g., processor and associated hardware, to perform one or more of the steps of the above-described method(s).

Numerous additional embodiments, within the scope of the present invention, will be apparent to those of ordinary skill in the art in view of the above description and the claims which follow.

What is claimed is:

1. A method of providing content to one or more devices, the method comprising:

receiving information indicating which one of a plurality of devices associated with a first customer account is to serve as a master device for timing synchronization purposes, wherein said information indicating which one of the plurality of devices is to serve as the master device indicates that a first device is to serve as the master device;

sending, from a first server, a first signal to the first device corresponding to said first customer account, said first signal including a first time stamp;

accessing, at a control device, first delay information indicating a first delay between a time the first signal was sent to the first device and a time the first signal was received by the first device;

sending a second signal to a second device corresponding to the first customer account, said second signal including a second time stamp, said second time stamp being the same or different from said first time stamp;

accessing, at the control device, second delay information indicating a second delay between a time the second signal was sent to the second device and a time the second signal was received by the second device; and performing, at the control device, at least one of: i) communicating an output delay to said first device to be applied by said first device prior to outputting content, said output delay being a function of at least one of said first delay information or said second delay information or ii) controlling delaying transmission of content to said second device by a first transmission delay time, said first transmission delay time being a function of at least one of said first delay information or said second delay information.

2. The method of claim 1, wherein said first server is a first content server.

3. The method of claim 2, wherein said first content server transmits content including said first time stamp in accordance with a broadcast schedule.

4. The method of claim 2, wherein said sending of a second signal to the second device is performed by an on demand content server.

5. The method of claim 1, wherein performing, at the control device, at least one of: i) communicating an output delay to said first device to be applied by said first device prior to outputting content, said output delay being a function of at least one of said first delay information or said second delay information or ii) controlling delaying transmission of content to said second device by a first transmission delay time includes:
communicating the output delay to said first device to be applied by said first device prior to outputting content, said output delay being a function of at least one of said first delay information or said second delay information.

6. The method of claim 1, further comprising:
receiving, at the control device, information from a user corresponding to said first customer account indicating which of said plurality of devices are to be synchronized for content viewing; and
storing, in a customer record corresponding to said first customer account, information indicating which of the plurality of devices is the master device and which of the plurality of devices are to be synchronized for content viewing.

7. The method of claim 1, wherein said first device is a set top box; and
wherein said first delay information indicating the first delay between the time the first signal was sent to the first device and the first signal was received by the first device is received from the set top box following set top box tuning to one of a broadcast channel or switched digital video channel which communicates content based on a broadcast schedule.

8. The method of claim 7, wherein the method includes communicating the output delay to said set top box.

9. The method of claim 8,
wherein the set top box buffers received content in memory and delays output of received content by the output delay following receipt of the output delay.

10. The method of claim 8, wherein the method further includes operating the control device to control delaying transmission of content to said second device by a first transmission delay time; and wherein operating the control device to control delaying transmission of content to said second device by a first transmission delay time includes communicating the first transmission delay time to a second content server which is used to transmit on demand content to the second device.

11. The method of claim 7, wherein the method includes operating the control device to control delaying transmission of content to said second device by a first transmission delay time; and
wherein operating the control device to control delaying transmission of content to said second device by a first transmission delay time includes communicating the first transmission delay time to a second content server which is used to transmit on demand content to the second device.

12. The method of claim 7, further comprising:
sending a third signal to a third device corresponding to the first customer account, said third signal including a third time stamp;
receiving, at the control device, third delay information indicating a third delay between the time the third signal was sent to the third device and the third signal was received by the third device; and
operating the control device to control delay transmission of content to said third device by a second transmission delay time, said second transmission delay time being a function of at least one of said first delay information, said second delay information or said third delay information.

13. The method of claim 7, further comprising:
sending content to said first and second devices in parallel.

14. The method of claim 12, further comprising:
sending content to at least two of said first, second, or third devices in parallel, content sent to at least one of said devices being delayed by said first transmission delay time or said second transmission delay time.

15. The method of claim 7, further comprising:
receiving a customer device synchronization request from one of said first and second devices.

16. The method of claim 15, further comprising:
determining at least one of said output delay or first transmission delay time in response to said customer device synchronization request.

17. The method of claim 16,
wherein said step of performing, at the control device, at least one of: i) communicating an output delay to said first device to be applied by said first device prior to outputting content, said output delay being a function of at least one of said first delay information or said second delay information or ii) control delaying transmission of content to said second device by a first transmission delay time, said first transmission delay time being a function of at least one of said first delay information or said second delay information is performed in response to the received customer device synchronization request.

18. A system for providing content to one or more devices, comprising:
a first server including a first processor configured to send, via a first interface, a first signal to a first device corresponding to a first customer account, said first signal including a first time stamp;
a control device including a communication interface configured to receive first delay information indicating a first delay between the time the first signal was sent to the first device and the first signal was received by the first device;

a second server including a second processor configured to send, via a second interface, a second signal to a second device corresponding to the first customer account, said second signal including a second time stamp, said second time stamp being the same or different from said first time stamp;

wherein said communication interface of said control device is further configured to receive second delay information indicating a second delay between the time the second signal was sent to the second device and the second signal was received by the second device; and wherein said control device further includes a control module configured to perform at least one of: i) control communicating an output delay to said first device to be applied by said first device prior to outputting content, said output delay being a function of at least one of said first delay information or said second delay information or ii) control adjusting transmission of content to said second device by a first transmission adjustment time, said first transmission adjustment time being a function of at least one of said first delay information or said second delay information.

19. The system of claim 18, wherein the communication interface of said control device is further configured to receive information indicating which one of a plurality of devices associated with the first customer account is to serve as a master device for timing synchronization purposes.

20. The system of claim 19, wherein said information indicating which one of the plurality of devices is to serve as the master device indicates that the first device is to serve as the master device, wherein the communication interface of said control device is further configured to receive information from a user corresponding to said first customer account indicating which of said plurality of devices are to be synchronized for content viewing; and wherein said control device further includes a customer record management module configured to control storage of information indicating which of the plurality of devices is the master device and which of the plurality of devices are to be synchronized for content viewing storing, in a customer record corresponding to said first customer account.

* * * * *